United States Patent [19]

Jones

[11] 3,789,654

[45] Feb. 5, 1974

[54] METHOD FOR DETERMINING THERMO-PHYSICAL PROPERTIES OF SPECIMENS

[75] Inventor: Robert A. Jones, Newport News, Va.

[73] Assignee: The United States of America as represented by the Administrator of the National Aeronautics and Space Administration, Washington, D.C.

[22] Filed: Aug. 18, 1972

[21] Appl. No.: 281,875

[52] U.S. Cl. .................................................. 73/15 R
[51] Int. Cl. .......................................... G01n 25/18
[58] Field of Search ................................. 73/15, 190

[56] References Cited
UNITED STATES PATENTS

| | | | |
|---|---|---|---|
| 3,570,302 | 3/1971 | Saver | 73/15 |
| 3,165,915 | 1/1965 | Parker | 73/15 |
| 3,279,239 | 10/1966 | Arends et al. | 73/15 |
| 3,566,669 | 3/1971 | Lawrence et al. | 73/15 |
| 3,433,052 | 3/1969 | Maley | 73/15 |
| 3,114,836 | 12/1963 | Fergason et al. | 73/356 |

OTHER PUBLICATIONS

"High-Speed–Measurement of Thermophysical Properties at High Temperatures in NBS Tech. News Bulletin Nov. 1970 pg. 253–255

*Primary Examiner*—Herbert Goldstein
*Attorney, Agent, or Firm*—Howard J. Osborn; Wallace J. Nelson; John R. Manning

[57] ABSTRACT

The square root of the product of thermophysical properties $\rho$, $c$ and $k$, where $\rho$ is density, $c$ is specific heat and $k$ is thermal conductivity, is determined directly on a test specimen such as a wind tunnel model. The test specimen and a reference specimen of known specific heat are positioned a given distance from a heat source. The specimens are provided with a coating, such as a phase change coating, to visually indicate that a given temperature has been reached as well as to ensure that both specimens have the same absorbtivity and thus receive the same heat rate. A shutter interposed between the heat source and the specimens is opened and a motion picture camera is actuated to provide a time record of the heating step. The temperature of the reference specimen is recorded as a function of time. The heat rate to which both the test and reference specimens have been subjected is determined from the temperature time response of the reference specimen by the conventional thin-skin calorimeter equation. This heat rate is then used to determine $\sqrt{\rho c k}$ of the test specimen from the transient one dimensional heat conduction equation for a semi-infinite solid subjected to a step heat input at a constant heat rate. A model, such as a wind tunnel model, can be tested directly thus eliminating the costly and inaccurate method of making test models solely for the purpose of determining $\sqrt{\rho c k}$.

9 Claims, 1 Drawing Figure

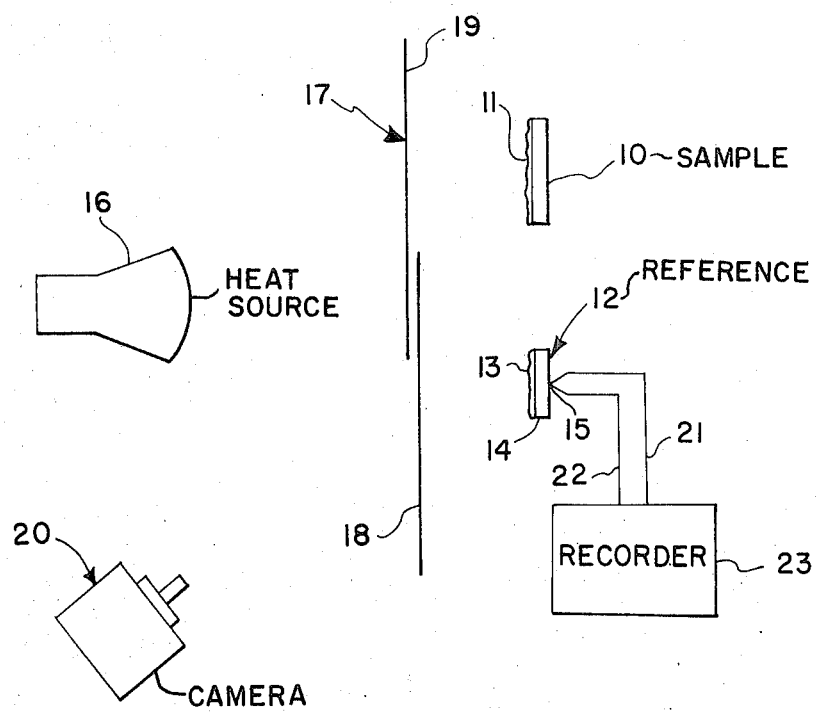

METHOD FOR DETERMINING THERMO-PHYSICAL PROPERTIES OF SPECIMENS

BACKGROUND OF THE INVENTION

This invention relates to a method and apparatus for determining $\sqrt{\rho ck}$, the square root of the product of thermophysical properties, $\rho$, $c$, and $k$, for a specimen.

Experimental aerodynamicists are presently relying extensively on the phase-change coating technique for measuring aerodynamic heat transfer to small complex wind tunnel models. This simple and useful technique employs a model made from a low-conductivity material usually plastic. The accuracy of the data obtained with this technique depends directly upon the accuracy with which the parameter $\sqrt{\rho ck}$, is known; $\rho$ being the density, $c$ being the specific heat, and $k$ being the thermal conductivity. The value of $\sqrt{\rho ck}$ varies from model to model as well as with temperature and even depth (in non-homogeneous materials) into the model material. Thus, it has been necessary in the past to make samples for each model cast and to measure $\rho$, $c$, and $k$ over a range of temperatures to obtain even acceptable accuracy with the phase-change technique. At the present time such measurements are being made using standard techniques for measurement. There are several major disadvantages of this known method.

The standard techniques (see for example the paper "Thermophysical Properties Measurements Performed for NASA" by H.L. Traiger and R.L. Wentworth - Dynateck Corp. Aug. 27, 1964) require elaborate equipment, specially trained technicians, and samples instrumented with thermocouples. The fabrication of samples and instrumenting them with thermocouples costs about as much as building a complex wind tunnel model.

Considerable time is required to instrument the thermal conductivity sample with thermocouples and the measurements are usually made in laboratories specializing in this type of work which requires sending the samples elsewhere for analysis. It often happens that wind tunnel tests are completed and the data reduced before the thermophysical properties are available.

There are several factors which make the conventional techniques less accurate than desired. These are:

a. the standard techniques now employed measure $\rho$, $c$, and $k$ independently so that the accuracy in the product $\sqrt{\rho ck}$ is the product of the inaccuracies of the individual measurements;

b. the measurements are made on samples of the model material, not the model itself and there may very well be differences between the properties of the model and that of the samples;

c. the standard techniques measure an average value for the thickness or bulk of the sample whereas it is known that the value of $\sqrt{\rho ck}$ in non-homogeneous samples actually varies with depth very near the surface and it is the property of this layer near the surface which is needed for accurate wind tunnel data since the short test times result in very little heat penetration.

It is an object of the invention to provide a new method and apparatus for determining the value of $\sqrt{\rho ck}$. It is a further object to provide such a method which at least minimizes the disadvantages mentioned above.

BRIEF SUMMARY

The foregoing and other objects which will be apparent to those of ordinary skill in the art are achieved according to the present invention by providing a method for determining the value of the square root of the product of thermophysical properties $\sqrt{\rho ck}$ of a material including the steps of providing a test specimen of a material to be tested, providing a reference specimen of a material having a known specific heat, subjecting a surface of the test and reference specimens simultaneously to a heat source located a given distance from the test and reference specimens said surfaces having the same absorptivity such that the test and reference specimens are subjected to the same heat rate, determining the time required to heat the reference specimen to a given temperature, determining the time required to heat the test specimen to the given temperature, measuring the temperature of the reference specimen as a function of time to determine the rate of change of temperature thereof with time, determining the heat rate to which the test and reference specimens were subjected, and determining from the heat rate the value of the square root of the product of thermophysical properties $\sqrt{\rho ck}$ for the specimen. Apparatus for carrying out the method includes a heat source, means for locating a test specimen of a material to be tested a given distance from the heat source, means for locating a reference specimen of a material having a known specific heat the given distance from the heat source, means for exposing the test and reference specimens to the heat source, means for determining the time required to heat the test specimen to a given temperature, means for determining the time required to heat the reference specimen to the given temperature, and means for measuring the temperature of the reference specimen as a function of time.

DETAILED DESCRIPTION

There follows a detailed description of a preferred embodiment of the invention, together with an accompanying drawing. However, it is to be understood that the detailed description and accompanying drawing are provided solely for the purpose of illustrating a preferred embodiment and that the invention is capable of numerous modifications and variations apparent to those skilled in the art without departing from the spirit and scope of the invention.

The drawing is a diagrammatic plan view of apparatus according to the invention.

A model 10, or a specimen of the model material, is provided with a coating 11 of "Tempilaq" phase-change temperature indicator having a melt temperature of the desired temperature of calibration. In this case the coatings may have a melt temperature in the range from 125° F to 500° F. A reference specimen 12 is made by coating a layer 13 of the same phase-change temperature indicator material on a thin sheet of stainless steel 14. Reference specimen 12, of course, is not the same material as that of model 10. A thermocouple 15 is welded to the rear side of sheet 14. By utilizing the same temperature indicator coating material on both specimens, the emissivity is the same thus insuring that both are subjected to the same heating rate. The test and reference specimens are located a given distance from radiant heat source 16, in this case a plurality of quartz heating lamps, only one of which is shown. The specimens may be located in this position by suitable indicia provided on a table top, by holding clamps, or the like.

A shutter 17, which can simply be in the form of two moveable plates 18, 19, is interposed between heat source 16 and the specimens 10 and 12.

A motion picture camera 20 having a known frame speed is positioned to photograph the front surfaces (that is the surfaces facing heat source 15) of the specimens on which surfaces the temperature indicating coatings are provided. Thermocouple leads 21, 22 are attached to a conventional recorder 23 which receives the electrical signal generated by thermocouple 14 and records temperature (or an electrical signal proportional thereto) as a function of time.

To calculate the value $\sqrt{\rho\, ck}$, quartz lamp 16 is turned on and, in this particular case, has a temperature in the range from 1,500° F to 5,000° F. It is desirable to keep the temperature of the heat source substantially higher than the highest temperature for which $\sqrt{\rho\, ck}$ is to be determined so that the change in temperature of the heated specimens will have a negligible effect on the imposed heat rate. A difference in temperature of at least 1,000° F is preferred. Initial temperature may be obtained by use of a conventional surface contact thermometer (not shown) or by any other conventional technique.

Motion picture camera 20 is started and shutter 17 is then rapidly opened to subject both specimens to a step input in radiative heat. The time required for the surface of the specimens to reach the phase change temperature, in this case a temperature in the range of 125° F to 500° F, is determined from the motion picture film record which is taken at a known frame rate.

The heat rate to which both specimens was subjected is then determined from the temperature-time response of thermocouple 15 on the back side of the reference specimen by the thin skin calorimeter equation:

$$Q = \rho\, c\, l\, dT/dt$$

eq. (1)

where Q = heat rate, $\rho$ = density of stainless steel sheet 12, c = specific heat of stainless steel sheet 12, l = thickness of stainless steel sheet 12, and $dT/dt$ = rate of change of temperature of stainless steel sheet 12 with time.

With this known heat rate, the value of $\sqrt{\rho\, ck}$ is determined from the transient one dimensional heat conduction equation for a semi-infinite solid subjected to a step input at a constant heat rate:

$$\sqrt{\rho\, ck} = Q/T_{pc} - T_i \cdot 2/\sqrt{\pi} \cdot \sqrt{t_m}$$

eq. (2)

where $T_{pc}$ = phase-change temperature $T_i$ = initial specimen temperature, and $t_m$ = time required for phase change to occur in coating 11 on test specimen 10.

In a specific example of the invention, the properties of reference heat gauge are as follows:

$\rho = 494.2$ lbs/ft³

$c = 0.1383$, Btu/(lb° F)

$l = 0.00395$ ft

The temperature-time history of reference heat gauge is as follows:

| t, secs. | $T_w$, °F |
|---|---|
| 190.16 | 75.7 |
| 191.01 | 75.7 |
| 192.01 | 77.2 |
| 193.09 | 78.5 |
| 193.91 | 79.4 |
| 194.50 | 80.2 |
| 195.19 | 81.1 |
| 195.96 | 82.0 |
| 197.135 | 83.5 |
| 198.01 | 84.5 |
| 198.885 | 85.5 |
| 199.76 | 86.2 |
| 200.635 | 87.0 |

The rate of change of temperature with respect to time of the reference heat guage, $dT_w/dt$, is found by fitting a curve to the above data and taking the derivative:

$$dT_w/dt = 1.127° \text{ F/sec.}$$

The reference heating rate is then found by equation 1:

$$Q = \rho\, c\, l\, dT_w/dt$$

Q = 494.2 lbs/ft³ × 0.1383 Btu/(lb ° F) × 0.000395 ft × 1.127 ° F/sec

Q = 0.3042 Btu/(ft² sec.)

The test conditions for the model specimen are:

$$T_{pc} = 103 \text{ ° F}$$

$$T_i = 75.7 \text{ ° F}$$

$$t_m = 4.8 \text{ secs.}$$

The square root of the thermophysical properties, $\sqrt{\rho\, ck}$, is then found by equation (2):

$\sqrt{\rho\, ck} = 0.3042$ Btu/(ft² sec)/103 ° F − 75.7 ° F (2/$\sqrt{\pi}$) $\sqrt{4.8 \text{ secs.}}$ $\sqrt{\rho\, ck} = 0.0275$ Btu/(ft² ° F sec 1/2)

The value of $\sqrt{\rho ck}$ can be determined according to the invention for various melt times by either using different phase-change coatings or by changing the imposed heat rate, or both. The heat rate is conveniently changed by changing the number of heat lamps used or the lamp temperature or both. In this manner, the value of $\sqrt{\rho ck}$ can be determined for various depths of heat penetration into the model surface.

It will be seen from the foregoing that the disadvantages associated with previously known methods have been overcome by the present invention. The actual test model can be used to determine $\sqrt{\rho ck}$ directly without determining the individual values of $\rho$, c, and k.

What is claimed is:

1. A method of determining the value of the square root of the product of thermophysical properties $\sqrt{\rho ck}$ of a material comprising the steps of:

providing a test specimen of a material to be tested;

providing a reference specimen of a material having a known specific heat, thickness and density;

subjecting a surface of the test and reference specimens of known initial temperature simultaneously to a heat source located a given distance from the test and reference specimens, said surfaces having the same absorptivity such that the test and reference specimens are subjected to the same heat rate;

determining the time required to heat the reference specimen to a given temperature;

determining the time required to heat the test specimen to said given temperature;

measuring the temperature of said reference specimen as a function of time to determine the rate of change of temperature thereof with time;

determining the heat rate to which the test and reference specimens were subjected; and determining from said heat rate the value of the product of thermophysical properties $\sqrt{\rho c k}$ for said specimen.

2. A method according to claim 1 wherein the test and reference specimens are each provided with means for visually indicating that said given temperature has been reached.

3. A method according to claim 2 wherein the time required to heat the reference and test specimens to said given temperature is determined by visual observation.

4. A method according to claim 2 wherein the time required to heat the reference and test specimens to said given temperature is determined by providing a motion picture record of the heating step and by analysis of the developed photographic record.

5. A method according to claim 2 wherein said visual indicating means comprises a phase change coating.

6. A method according to claim 1 wherein said heat rate is determined from the equation:

$Q = \rho\, c\, l\, dT/dt$ wherein $Q$ = heat rate, $\rho$ = density of the reference specimen, $c$ = specific heat of the reference specimen, $l$ = thickness of the reference specimen; and $dT/dt$ = rate of change of temperature of the reference specimen with time.

7. A method according to claim 1 wherein the value of $\sqrt{\rho c k}$ is determined from the following equation:

$$\sqrt{\rho\, ck} = Q/Tg - Ti \cdot (2/\sqrt{\pi}) \cdot \sqrt{t}$$

where $Q$ = the heat rate $Tg$ = the given temperature $Ti$ = the initial temperature of the specimens, $t$ = time required for test specimen to reach the given temperature.

8. A method according to claim 1 wherein said heat source comprises a radient heat source.

9. A method according to claim 1 wherein the temperature of said heat source is sufficiently higher than said given temperature that the change in temperature of the specimens has a negligible effect on the imposed heat rate.

* * * * *